United States Patent [19]

Shimoyama et al.

[11] Patent Number: 4,923,026
[45] Date of Patent: May 8, 1990

[54] FLOOR DEVICE FOR VEHICLES

[75] Inventors: Hiroshi Shimoyama, Saitama; Katsuyoshi Kawasaki, Tokyo, both of Japan

[73] Assignee: Honda Giken Kogyo Kabushiki Kaisha, Tokyo, Japan

[21] Appl. No.: 723,006

[22] Filed: Apr. 16, 1985

Related U.S. Application Data

[63] Continuation of Ser. No. 339,384, Jan. 15, 1982, abandoned.

[30] Foreign Application Priority Data

Jan. 23, 1981 [JP] Japan .................... 56-8880[U]

[51] Int. Cl.$^5$ .................................... B62D 61/08
[52] U.S. Cl. ............................ 180/215; 180/219; 180/90.6; 280/152.1
[58] Field of Search ............ 180/210, 215, 216, 217, 180/219, 220, 225, 227, 90.6; 280/152.1

[56] References Cited

U.S. PATENT DOCUMENTS

| | | | |
|---|---|---|---|
| 2,225,914 | 12/1940 | Lewis et al. | 180/219 |
| 3,369,629 | 2/1968 | Weiss | 180/216 |
| 4,356,876 | 11/1982 | Watanabe et al. | 180/210 |

*Primary Examiner*—David M. Mitchell
*Attorney, Agent, or Firm*—Irving M. Weiner; Joseph P. Carrier; Pamela S. Burt

[57] ABSTRACT

A floor device for a vehicle including a single front wheel, comprising a floor portion arranged to be substantially flat in the longitudinal direction of the vehicle and a foot rest portion formed to be continuous with a front portion of the floor portion, the foot rest portion extending obliquely upwardly forwardly from the front portion of the floor portion at least to the vicinity of a steering support member of the front wheel.

Sufficient longitudinal floor length is obtainable, without extension of the wheel base, to assure a comfortable freedom of the driver at his feet.

9 Claims, 3 Drawing Sheets

FLOOR DEVICE FOR VEHICLES

This is a continuation of application Ser. No. 339,384, filed Jan. 15, 1982, now abandoned.

BACKGROUND OF THE INVENTION

1. Field of the Invention

The present invention relates to a floor device for vehicles, and more particularly, to a floor device for vehicles of a low floor type having a single front wheel.

2. Description of Relevant Art

There have been proposed floor devices for vehicles of a low floor type having a single front wheel, such as scooters and motor bicycles and prime mover-equipped tricycles similar thereto, in which a substantially flat footing floor has the front portion thereof ending substantially behind the front wheel, thus not always permitting the longitudinal floor dimension to be sufficiently large to assure a comfortable freedom of the driver at his feet.

In a vehicle of such conventional floor structure, when the longitudinal floor length is desired to be sufficiently long, the front wheel must be disposed in a forwardly shifted position, thus resulting in an unavoidable extension of the wheel base which renders the vehicle size larger.

The present invention effectively overcomes such problems in conventional floor devices.

SUMMARY OF THE INVENTION

The present invention provides a floor device for a vehicle including a single front wheel, comprising a floor portion arranged to be substantially flat in the longitudinal direction of the vehicle and a foot-rest portion formed to be continuous with a front portion of the floor portion, the foot-rest portion extending obliquely upwardly forwardly from the front portion of the floor portion at least to the vicinity of a steering support member of the front wheel.

It is an object of the present invention to provide a floor device for a vehicle including a single front wheel in which the longitudinal floor length can be extended sufficiently, without extension of the wheel base, to assure a comfortable freedom of the driver at his feet.

The above and other objects, features and advantages of the invention will become apparent from the following detailed description when the same is read in connection with the accompanying drawings.

DETAILED DESCRIPTION OF PREFERRED EMBODIMENTS

Figure 1:
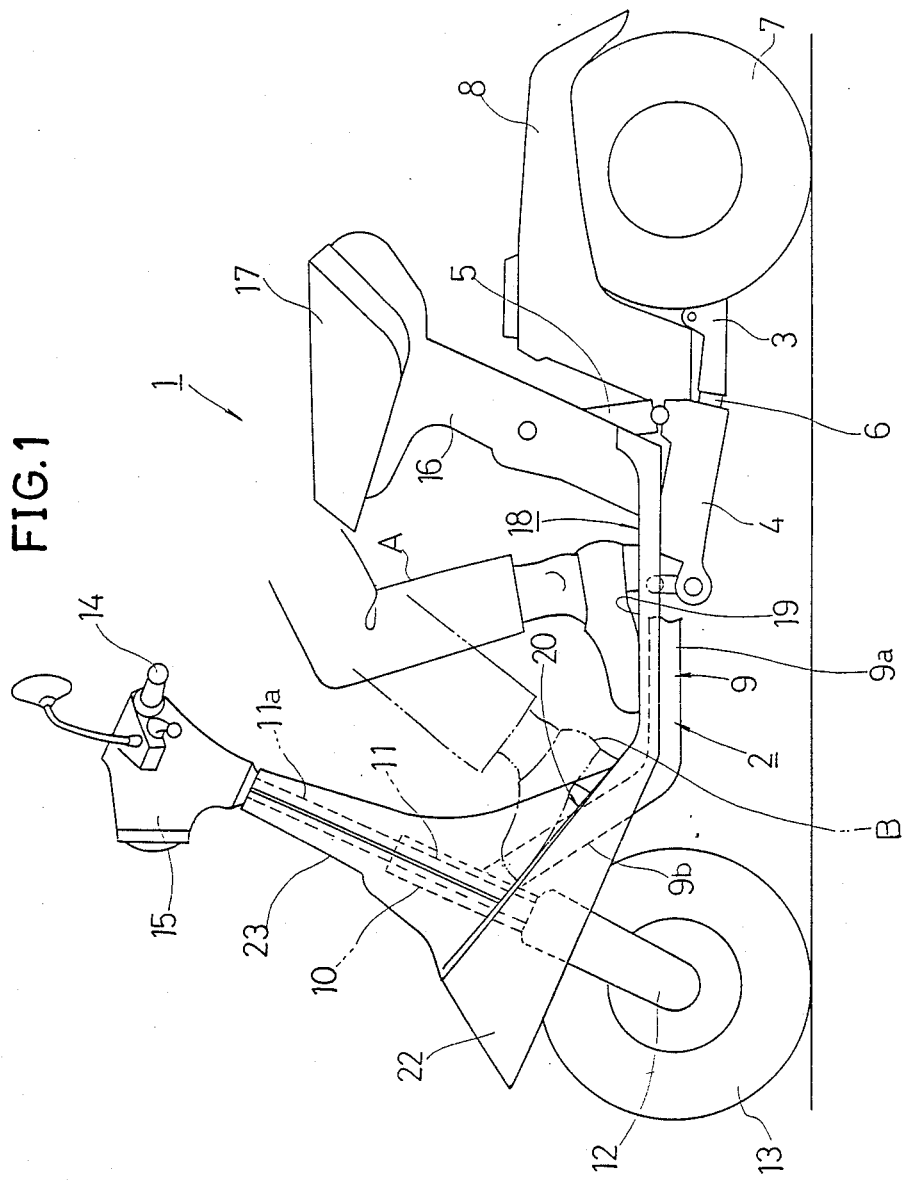
FIG. 1 is a side elevational view of a vehicle including a floor device embodying the present invention.

Referring now to the drawings, and particularly to FIG. 1, generally designated at the reference symbol 1 is a vehicle of a low-floor type having a single front wheel 13. The vehicle 1 includes a front frame 2 and a rear frame 3. The front frame 2 is provided at the underside of the rear part thereof with a swing joint 4 cushioned by a cushion unit 5 and connected through a rolling joint shaft 6 to the rear frame 3 which in turn has at either lateral end thereof a pair of rear wheels 7 supported thereby and driven by a power unit (not shown) protected by a rear fender 8.

The front frame 2 is forked into a pair of pipe members 9 each having the intermediate and rear portion 9a thereof arranged to be low and substantially horizontal and the front portion 9b thereof directed substantially obliquely upwardly forwardly to constitute a down tube portion of the front frame 2. The respective front portions 9b of the paired pipe members 9 have the front ends thereof extending close to each other to be jointed to the lower part of a head tube 10 on the rear side thereof. The head tube 10 supports a steering stem 11 rotatably provided therethrough which in turn has, under the head tube 10, the lower end thereof secured to a front fork 12 supporting the front wheel 13 as a single dirigible road wheel. Further, the stem 11 has, above the head tube 10, the upper portion 11a thereof secured to a 14. In front of the 14, there is provided a front unit 15 including a headlight and instruments (not shown). Extending upwardly from the rear part of the front frame 2 is a seat post 16 supporting at the upper end thereof a seat 17.

Figure 2:
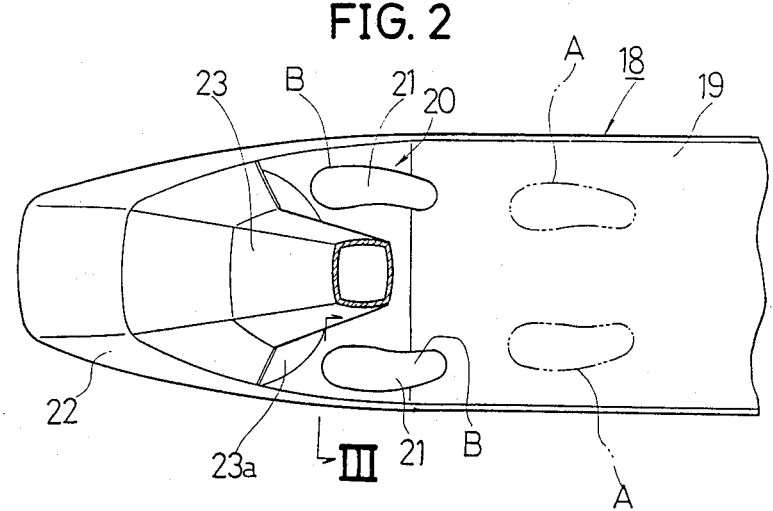
FIG. 2 is a partial plan view of the vehicle of FIG. 1, with parts broken away.
Figure 3:
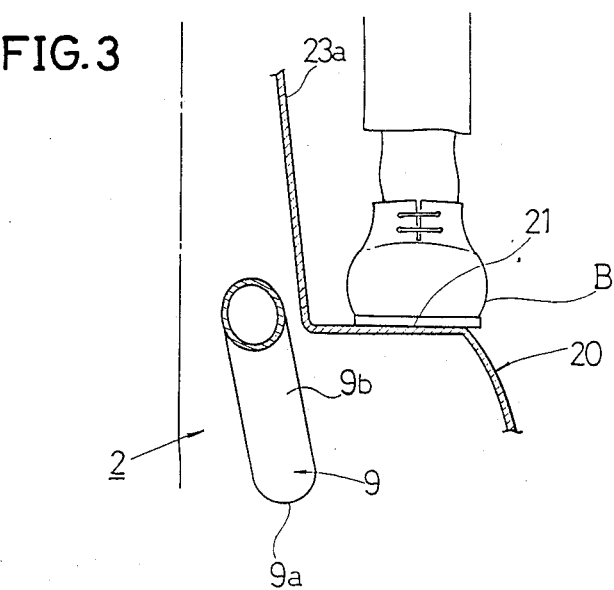
FIG. 3 is a partially sectional view taken along line III—III of FIG. 2.
Figure 4:
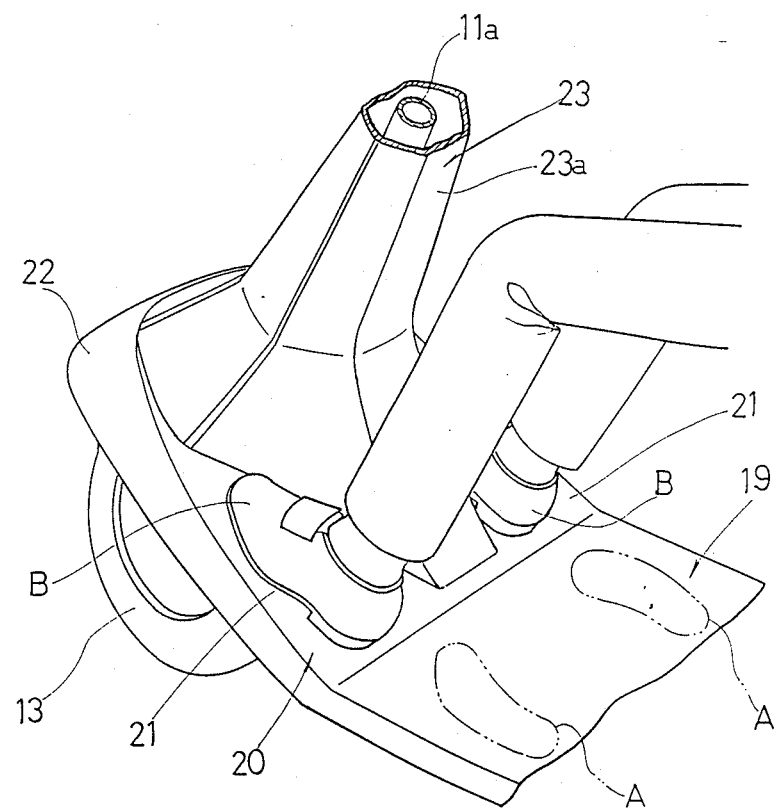
FIG. 4 is a perspective view of a principal portion of the vehicle of FIG. 1.

Above the front frame 2 there is provided a floor member 18 extending longitudinally of the vehicle 1. The floor member 18, which may be of a pressed steel sheet or molded compound resin, includes a substantially flat portion 19 extending substantially from below the seat post 16 to the front end of the intermediate and rear portion 9a of each pipe member 9, i.e. behind the front wheel 13, and an inclined portion 20 extending to substantially cover the front portion 9b of each pipe member 9 from the front end of the flat portion 19 to above the rear part of the front wheel 13. The inclined portion 20 is rendered to be substantially symmetrical with respect to a longitudinal vertical plane containing the axis of the head tube 10, so that a pair of footrest portions 21 are formed on either lateral side of the head tube 10 as shown in FIGS. 2 to 4. Between the footrest portions 21 there extends upwardly a cover 23 defining a handle post surrounding the head tube 10 and the steering stem 11, including an upwardly projecting portion 11a of the stem 11. The cover 23 has the rear half portion 23a thereof formed to be integral with the inclined portion 20 of the floor member 18, while the front lower part of the cover 23 is extended forwardly downward to form a front fender 22 hanging over the front wheel 13.

The floor member 18 comprises of the flat portion 19, which is a relatively low flat footing floor extending to behind the front wheel 13, and the inclined footrest portions 21 disposed on either lateral side of the cover 23.

Accordingly, the drive can drive the vehicle 1, with his feet placed in arbitrary positions A on the flat portion 19 or at convenient positions B on the footrest portions 21, so that he can enjoy remarkably enhanced freedom at his feet.

In the foregoing embodiment, the vehicle 1 is described as a prime mover-equipped tricycle. However, it may be comprise any vehicle of a low floor type similar to a scooter, such as a motor bicycle.

Although there have been described what is at present considered to be the preferred embodiments of the invention, it will be understood that the present invention may be embodied in other specific forms without departing from the spirit or essential characteristics thereof. The present embodiments is therefore to be considered in all respect as illustrative, and not restrictive. The scope of the invention is indicated by the appended claims rather than by the foregoing description.

We claim:

1. A floor device for a vehicle including a single front wheel, comprising:
   a floor portion arranged to be substantially flat in the longitudinal direction of said vehicle;
   a footrest portion formed to be continuous with a front portion of said floor portion;
   said footrest portion extending obliquely upwardly forwardly from said front portion of said floor portion to above said front wheel on both lateral sides of a steering support member of said front wheel, said steering support member comprising a head tube supporting a steering stem provided therethrough for steering said front wheel;
   said footrest portion comprising an integral cover portion which surrounds the entirety of said head tube;
   said cover portion comprising a portion defining a fender of said front wheel;
   said cover portion covers the entirety of said steering stem; and
   said cover portion extends upwardly to a front unit of said vehicle having a headlight and instruments mounted therein.

2. A floor device according to claim 1, wherein: said vehicle is of a scooter type.

3. A floor device according to claim 1, wherein: said vehicle comprises a motor bicycle.

4. A floor device according to claim 1, wherein: said vehicle comprises a prime mover-equipped tricycle.

5. A floor device according to claim 1, wherein: said floor portion, said footrest portion, said cover portion and said fender together define an integral unit.

6. A floor device according to claim 1, wherein: said fender extends downwardly so as to cover an upper part of said front wheel.

7. A floor device for a vehicle including a single front wheel, comprising:
   a floor portion arranged to be substantially flat in the longitudinal direction of said vehicle;
   a footrest portion formed to be continuous with a front portion of said floor portion;
   said footrest portion extending obliquely upwardly forwardly from said front portion of said floor portion to above said front wheel on both lateral sides of a steering support member of said front wheel, said steering support member comprising a head tube supporting a steering stem provided therethrough for steering said front wheel;
   a front unit of said vehicle provided in front of a handlebar and having a headlight and instruments mounted therein;
   an upstanding cover extending from said footrest portion upwards to said front unit of said vehicle so as to cover the entirety of said head tube and said steering stem; and
   a front lower part of said cover extends forwardly downward to form a front fender.

8. A floor device according to claim 7, wherein: said upstanding cover has the rear half portion thereof formed integral with said footrest portion.

9. A floor device for a vehicle including a single front wheel, comprising:
   a floor portion arranged to be substantially flat in the longitudinal direction of said vehicle;
   a frame having a pair of pipe members each of which is arranged to be low and substantially horizontal and above which said floor portion is provided;
   a footrest portion formed to be continuous with a front portion of said floor portion;
   said footrest portion extending obliquely upwardly forwardly from said front portion of said floor portion to above said front wheel on both lateral sides of a steering support member of said front wheel, said steering support member comprising a head tube supporting a steering stem provided therethrough for steering said front wheel;
   said footrest portion comprising an integral cover portion which surrounds the entirety of said head tube;
   said cover portion comprising a portion defining a fender of said front wheel;
   said cover portion covers the entirety of said steering stem; and
   said cover portion extends upwardly to a front unit of said vehicle having a headlight and instruments mounted therein.

* * * * *

UNITED STATES PATENT AND TRADEMARK OFFICE
CERTIFICATE OF CORRECTION

PATENT NO. : 4,923,026
DATED : May 8, 1990
INVENTOR(S) : SHIMOYAMA et al.

It is certified that error appears in the above-identified patent and that said Letters Patent is hereby corrected as shown below:

```
Column 1, line 42, after "wheel" insert a comma;
         line 64, change "at the reference symbol" to --by reference
numeral--.
Column 2, line 21, before "14" (both occurrences) insert --handlebar--;
delete the comma;
         line 32, after "i.e." insert a comma;
         line 63, delete "be".
Column 3, line 2, change "is" to --are--;
         line 3, change "respect" to --respects--.
```

Signed and Sealed this

Eighteenth Day of February, 1992

Attest:

HARRY F. MANBECK, JR.

*Attesting Officer*      *Commissioner of Patents and Trademarks*